United States Patent
Nalawadi et al.

(10) Patent No.: US 7,143,234 B2
(45) Date of Patent: Nov. 28, 2006

(54) BIOS STORAGE ARRAY

(75) Inventors: Rajeev K. Nalawadi, Folsom, CA (US); Dong Thai, Elk Grove, CA (US)

(73) Assignee: Intel Corporation, Santa Clara, CA (US)

( * ) Notice: Subject to any disclaimer, the term of this patent is extended or adjusted under 35 U.S.C. 154(b) by 289 days.

(21) Appl. No.: 10/305,727

(22) Filed: Nov. 26, 2002

(65) Prior Publication Data

US 2004/0103260 A1   May 27, 2004

(51) Int. Cl.
*G06F 12/00* (2006.01)
*G06F 12/16* (2006.01)

(52) U.S. Cl. .................. 711/114; 711/157; 711/173; 714/6

(58) Field of Classification Search .............. 711/173, 711/114; 714/6
See application file for complete search history.

(56) References Cited

U.S. PATENT DOCUMENTS

| | | | |
|---|---|---|---|
| 6,098,119 A * | 8/2000 | Surugucchi et al. | 710/10 |
| 6,401,183 B1 * | 6/2002 | Rafizadeh | 711/173 |
| 6,457,096 B1 * | 9/2002 | Ageishi et al. | 711/112 |
| 6,681,290 B1 * | 1/2004 | Brower et al. | 711/114 |
| 2002/0120812 A1 | 8/2002 | Ageishi et al. | |
| 2002/0156971 A1 * | 10/2002 | Jones et al. | 711/114 |

\* cited by examiner

*Primary Examiner*—Donald Sparks
*Assistant Examiner*—Jesse Diller
(74) *Attorney, Agent, or Firm*—Jeffrey B. Huter

(57) ABSTRACT

Methods, apparatus and machine readable medium are described in which BIOS initialization code divides one or more storage devices into two or more portions. Further, a BIOS device handler may use the portions of the divided storage devices to implement a storage array that provides attributes of one or more RAID levels.

18 Claims, 7 Drawing Sheets

BIOS STORAGE ARRAY

BACKGROUND

Storage arrays may help increase data access performance and/or increase fault tolerance. Such storage arrays are commonly described as implementing one or more RAID (redundant arrays of inexpensive disks) levels. For example, RAID level 0 or RAID 0 is commonly used to refer to a storage array that comprises two or more storage devices in which data reads and writes are striped across the storage devices of the array. Striping data reads and writes across the storage devices of the array tends to increase read and write performance since the storage devices of the array are basically accessed in parallel to fulfill the read or write request. A RAID 0 array provides no redundancy, however, and thus does not increase the fault tolerance of the array. As a result, if any storage device of a RAID 0 array fails, all data of the array is generally lost since data associated with the failed storage device is scattered throughout the array.

RAID level 1 or RAID 1 is commonly used to refer to a storage array that comprises two or more storage devices in which data writes are mirrored to each storage device of the array. Mirroring data writes to each storage device of the array generally increases the fault tolerance of the array since if any storage device of the array fails, the data may still be retrieved from another storage device of the array. However, mirroring data writes tends to decrease write performance due to the additional data writes required to mirror the data to other storage devices of the array. Mirroring data may increase read performance if reads are balanced/striped across storage devices of the array. However, many implementations simply direct all read requests to a single storage device of the array and only read from other storage devices of the array in response to a failure.

Finally, RAID level 0+1 or RAID 0+1 is commonly used to refer to a storage array that comprises four or more storage devices in which data writes are mirrored to striped arrays. For example, a RAID 0+1 array may comprise a first RAID 0 array and a second RAID 0 array. The array may further write data to the first RAID 0 array and may mirror the data to the second RAID 0 array in accordance with RAID 1. Again, mirroring data writes generally increases the fault tolerance of the array but decreases write performance due to the additional writes. However, some of the write performance decrease may be offset by the first and second RAID 0 arrays striping data across the storage devices of their respective arrays.

BRIEF DESCRIPTION OF THE DRAWINGS

The invention described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference numerals have been repeated among the figures to indicate corresponding or analogous elements.

DETAILED DESCRIPTION

In the following detailed description, numerous specific details are described in order to provide a thorough understanding of the invention. However, the present invention may be practiced without these specific details. In other instances, well-known methods, procedures, components and circuits have not been described in detail so as not to obscure the present invention. Further, example sizes/models/values/ranges may be given, although some embodiments may not be limited to these specific examples.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Further, the terms "first", "second", "third", etc. are used herein as labels to distinguish between similarly named components and/or operations. In particular, such terms are not used to signify and are not meant to signify an ordering of components and/or operations. Further, such terms are not used to signify and are not meant to signify one component and/or operation having greater importance than another.

Figure 1:
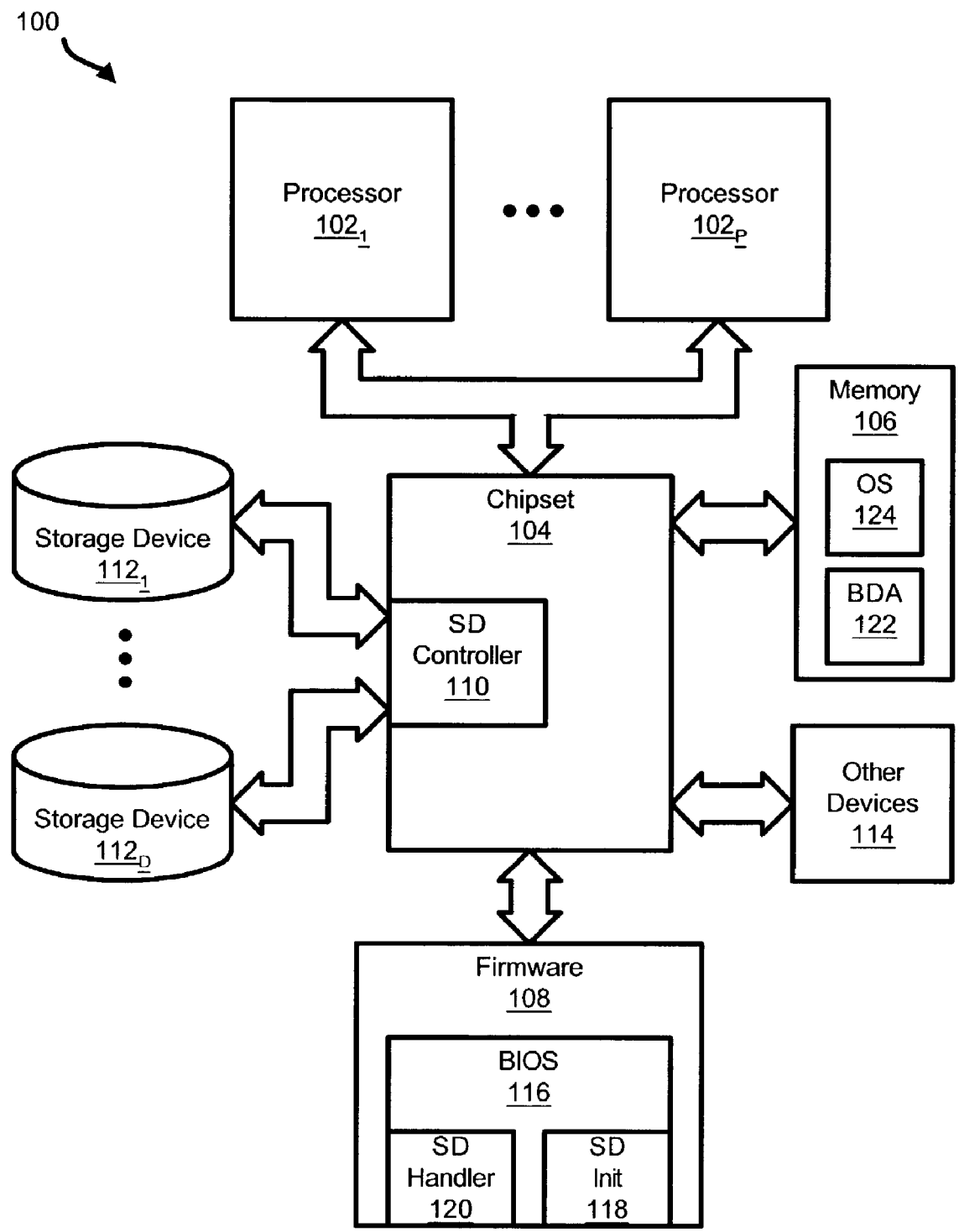
FIG. 1 illustrates an example computing device comprising at least one storage device.

An example embodiment of a computing device 100 is shown in FIG. 1. The computing device 100 may comprise one or more processors $102_1 \ldots 102_P$ that are coupled to a chipset 104 via a processor bus. The chipset 104 generally interconnects the one or more processors $102_1 \ldots 102_P$ with memory 106, firmware 108, a storage device (SD) controller 110, one or more storage devices $112_1 \ldots 112_D$, and other devices 114 (e.g. a mouse, keyboard, video controller, floppy disk, network interface controller, modem, etc.) via one or more packaged integrated circuit devices or chips that comprise the chipset 104. In particular, the other devices 114 may be coupled to the chipset 104 via various bridges and buses such as, for example, peripheral component interconnect (PCI) buses, accelerated graphics port (AGP) buses, universal serial bus (USB) buses, low pin count (LPC) buses, other I/O buses, and/or associated bridges.

The SD controller 110 in general provides an interface for reading from and writing data to the storage devices $112_1 \ldots 112_D$ that are coupled to the SD controller 110 via one or more buses. In one embodiment, the SD controller 110 is embedded in the chipset 104. However, in another embodiment, the SD controller 110 is separate from the chipset 104 and may be provided by an add-in card inserted into a slot of the computing device 100 such as, for example, a PCI (Peripheral Component Interconnect) slot, a PCI Express slot, an ISA (Industry Standard Architecture) slot, and/or some other type of peripheral interconnection. Further, the SD controller 110 may interface with the storage devices $112_1 \ldots 112_D$ via a storage interface protocol supported by the storage devices $112_1 \ldots 112_D$. For example, the SD controller 110 and storage devices $112_1 \ldots 112_D$ may support one or more of the following interface protocols IDE (Integrated Drive Electronics), ATA (Advanced Technology Attachment), Serial ATA, SCSI (Small Computer System Interface), and/or Serial SCSI.

The firmware 108 may comprise basic input/output system (BIOS) code 116. The BIOS 116 may comprise instructions and routines that the one or more processors $102_1 \ldots 102_P$ may execute to access and initialize components of the computing device 100. In one embodiment, the BIOS 116 may comprise SD initialization code 118 which the one or more processors $102_1 \ldots 102_P$ may execute to initialize the one or more storage devices $112_1 \ldots 112_D$. Further, the BIOS 116 may comprise an SD handler 120 to read data from the one or more storage devices $112_1 \ldots 112_D$ and to write data to the one or more storage devices $112_1 \ldots 112_D$. In one particular embodiment, the SD initialization code 118 may associate an interrupt vector such as, for example, interrupt vector 13H with the SD handler 120. Accordingly, the one or more processors $102_1 \ldots 102_P$ may execute the SD handler 120 in response to a software interrupt such as, for example, software interrupt 13H which conventionally has been associated with BIOS code for accessing IDE hard disks in x86 personal computers.

The memory 106 may comprise one or more memory devices that provide addressable storage locations to which the processors $102_1 \ldots 102_P$ may read and write data. In particular, the memory 106 in one embodiment may comprise a BIOS data area 122 and an operating system 124. The one or more processors $102_1 \ldots 102_P$ may execute the operating system 124 to access and control components of the computing device 100 and to provide a user with an operating environment to interact with the computing device 100. Further, the memory 106 may be implemented using one or more memory technologies such as, for example, dynamic random access memory (DRAM) devices, synchronous dynamic random access memory (SDRAM) devices, double data rate (DDR) SDRAM devices, quad data rate (QDR) SDRAM devices, or other volatile or non-volatile memory devices.

For convenience, the BIOS 116, the SD initialization code 118, the SD handler 120, the operating system 124, boot loaders, and/or other software/firmware may be described herein as performing one or more operations. However, it should be appreciated that hardware of the computing device 100 such as, for example, the processors $102_1 \ldots 102_P$ may perform such operations in response to executing instructions of the BIOS 116, the SD initialization code 118, the SD handler 120, the operating system 124, boot loaders, and/or other software/firmware.

Figure 2:
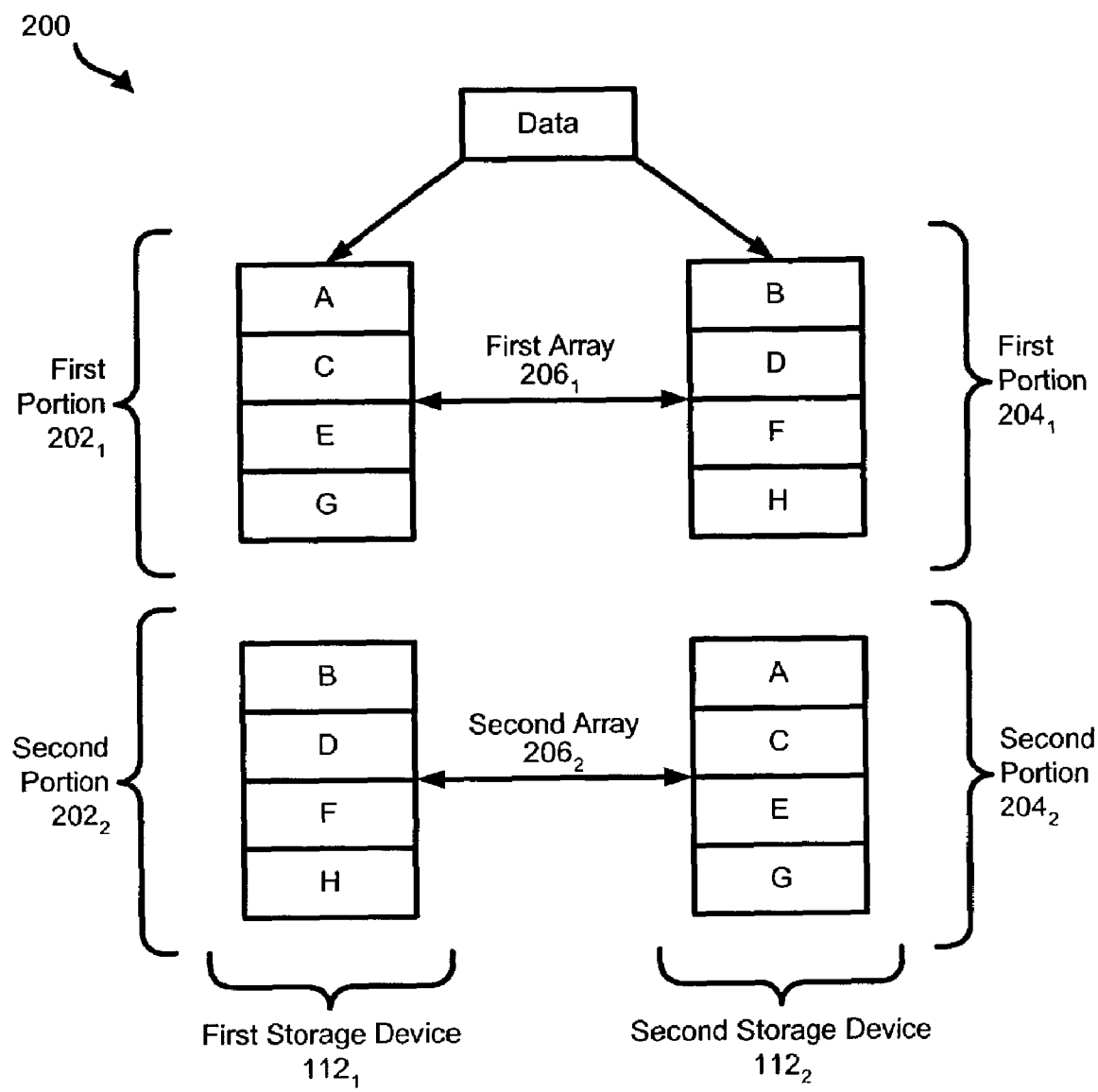
FIG. 2 illustrates an example storage array of the computing device of FIG. 1.

Referring now to FIG. 2, an example storage array 200 is shown that implements RAID 0+1. As shown, the storage array 200 may comprise two storage devices $112_1$, $112_2$, whereas conventional RAID 0+1 arrays require at least four storage devices. As depicted, the first storage device $112_1$ comprises a first portion $202_1$ and a second portion $202_2$, and the second storage device $112_2$ comprises a first portion $204_1$ and a second portion $204_2$. In general, the first portion $202_1$ of the first storage device $112_1$ and the first portion $204_1$ of the second storage device $112_2$ combine to form a first RAID 0 array $206_1$ in which data is striped across the first portions $202_1$, $204_1$. Similarly, the second portion $204_2$ of the second storage device $112_2$ and the second portion $202_2$ of the first storage device $112_1$ combine to form a second RAID 0 array $206_2$ in which data is striped across the second portions $204_2$, $202_2$. Further, the first RAID 0 array $206_1$ and the second RAID 0 array $206_2$ combine to form a RAID 1 array in which data of the first RAID 0 array $206_1$ is mirrored the second RAID 0 array $206_2$.

For example, as illustrated in FIG. 2, data may be split into chunks A . . . H and written to the storage array 200. As a result of writing the chunks A . . . H to the storage array 200, the chunks A . . . H may be written to the first RAID 0 array $206_1$ and mirrored to the second RAID 0 array $206_2$. Further, the chunks A . . . H written to the first RAID 0 array $206_1$ may be striped across the first portions $202_1$, $204_1$ of the storage devices $112_1$, $112_2$. In particular, the chunks A, C, E, and G may be written to the first portion $202_1$ of the first storage device $112_1$ and the chunks B, D, F, and H may be written to the first portion $204_1$ of the second storage device $112_2$. Similarly, the chunks A . . . H written to the second RAID 0 array 2062 may be striped across the second portions $202_2$, $204_2$ of the storages devices $112_1$, $112_2$. In particular, the chunks A, C, E, and G may be written to the second portion $204_2$ of the second storage device $112_2$ and the chunks B, D, F, and H may be written to the second portion $202_2$ of the first storage device $112_1$.

In one embodiment, the first storage device $112_1$ is coupled to a first IDE bus or channel as a master device and the second storage device $112_2$ is coupled to a second IDE bus or channel as a master device. By coupling the two storage devices $112_1$, $112_2$ to separate buses the SD handler 120 may request the SD controller 110 to access the storage devices $112_1$, $112_2$ in parallel or substantially in parallel. Data mirroring in general doubles the number of bytes written to the storage devices $112_1$, $112_2$ and therefore doubles the number of bytes transferred over buses in comparison to a non-mirroring storage device system. However, striping the data across the two storage devices $112_1$, $112_2$ and their associated buses $208_1$, $208_2$ generally provides twice the bandwidth of a storage device system having single bus and a single storage device. Accordingly, the array of FIG. 2 may achieve data performance that is on par with a single storage device despite mirroring of data. Further, the RAID 0+1 array of FIG. 2 may achieve data read performance that approaches twice the read performance as a single storage device system since read requests may be striped across the storage devices $112_1$, $112_2$ and serviced in parallel. Moreover, the array of FIG. 2 may gracefully tolerate a failure of the first storage device $112_1$ or the second storage device $112_2$ since all data of one storage device is mirrored to the other storage device.

Figure 3:
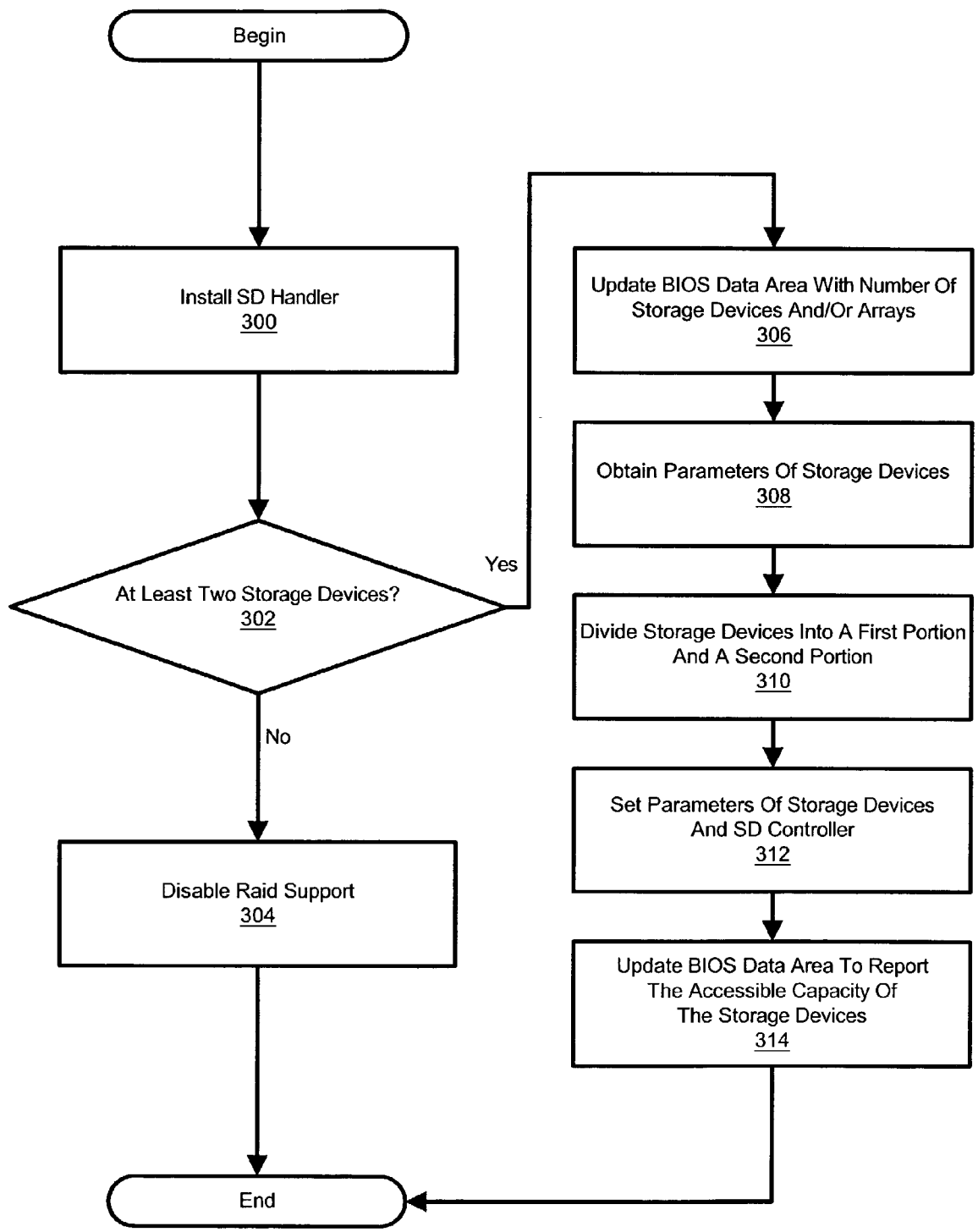
FIG. 3 illustrates an example method of initializing the array of FIG. 2.

In FIG. 3, an example method of creating the array of FIG. 2 is illustrated. In one embodiment, the computing device 100 may execute the method of FIG. 3 in response to various events such as, for example, a system power-up event, a system reset event, etc. Further, the computing device 100 in one embodiment may execute the method of FIG. 3 prior to invoking the operating system 124 or a boot loader used to invoke execution of the operating system 124.

In block 300, the SD initialization code 118 may install the SD handler 120. In one embodiment, the SD initialization code may copy the SD handler 120 from the firmware 108 to the memory 106 and may update an interrupt vector associated with interrupt 13H to point to an entry point of the SD handler 120 stored in the memory 106. Further, the SD initialization code 118 may update an interrupt vector associated with another interrupt such as, for example, interrupt 40H to point to an entry point of a conventional SD handler (not shown) of the BIOS 116 that historically has been associated with interrupt 13H. Accordingly, the processors $102_1 \ldots 102_P$ in one embodiment may execute the SD handler 120 in response to interrupt 13H and may execute the conventional SD handler in response to interrupt 40H. However, it should be appreciated that for a given computer architecture, the SD initialization code 118 may need to perform additional and/or different operations in order to associate the SD handler 120 with a particular interrupt. Further, the SD initialization code 118 may associate the SD initialization code 118 with a different interrupt and/or with multiple interrupts.

The SD initialization code 118 may further determine in block 302 whether there are at least two usable storage devices $112_1 \ldots 112_D$ connected to the SD controller 110. To this end, the SD initialization code 118 may perform various tests and/or diagnostics. For example, the SD initialization code 118 may determine whether each channel of the SD controller 110 is coupled to one or more storage devices $112_1 \ldots 112_D$. Further, the SD initialization code 118 may perform one or more diagnostic tests to ascertain whether each storage device $112_1 \ldots 112_D$ coupled to the SD controller 110 is functioning properly and may disable channels of the SD controller 110 and/or storage devices $121_1 \ldots 112_D$ which are not functioning properly. It should be appreciated that such tests and diagnostics are generally dependent upon the storage technologies used by the SD controller 110 and the storage devices $112_1 \ldots 112_D$. As a result, the SD initialization code 118 may only support certain storage technologies and may be implemented using various testing and diagnostic techniques such as, for example, reading status registers of the storage devices, and/or determining whether data may be successfully written to and/or read from the storage devices.

In response to determining that there are not at least two usable storage devices, the SD initialization code 118 in block 304 may disable RAID support and exit. Otherwise, the SD initialization code 118 in block 306 may update the BIOS data area 122 to report to the operating system 124 the number of storage devices and/or arrays that are coupled to the SD controller 110. In one embodiment, the SD initialization code 118 may report each RAID 0+1 array as a single storage device despite each RAID 0+1 array comprising two storage devices $112_1 \ldots 112_D$. Accordingly, the SD initialization code 118 in such an embodiment may obtain the effective number of storage devices $112_1 \ldots 112_D$ by simply dividing the usable number of usable storage devices $112_1 \ldots 112_D$ obtained in block 302 by two. Accordingly, if the SD initialization code 118 detected two storage devices $112_1, 112_2$, then the SD initialization code 118 may update the BIOS data area 122 to report a single storage device to the operating system 124.

The SD initialization code 118 in block 308 may obtain parameters of the storage devices $112_1 \ldots 112_D$. In one embodiment, the SD initialization code 118 may issue an IDENTIFY DEVICE command to each ATA storage device $112_1 \ldots 112_D$ in order to obtain 512 bytes of device identification data. In one embodiment, the device identification data may comprise the number of logical cylinders, the number of logical heads, and the number of logical sectors per a logical track which together define supported geometries of the storage device 112. Further, the device identification data may comprise the current number of logical cylinders, the current number of logical heads, and the current number of of logical sectors per a track which together define a current geometry of the storage device 112. The identification data may also comprise the current storage capacity in sectors and the total number of user addressable sectors either of which may be used to determine the current storage capacity of the storage device. Furthermore, the device identification data may comprise information about operating parameters such as, for example, parameters relating to DMA transfers, command sets, PIO modes, power management, etc.

In block 310, the SD initialization code 118 may divide the first storage device $112_1$ into two substantially equal portions $202_1, 202_2$ and may divide the second storage device $112_2$ into two substantially equal portions $204_1, 204_2$. In one embodiment, the SD initialization code 118 may divide the first storage devices $112_1$ into a first portion $202_1$ and a second portion $202_2$ by issuing a SET MAX command to the first storage device $112_1$ that sets the maximum accessible sector of the first storage device $112_1$ to the number of sectors in the smallest portion $202_1, 202_2$ of the first storage device $112_1$. Similarly, the SD initialization code 118 may divide the second storage device $112_2$ into a first portion $204_1$ and a second portion $204_2$ by issuing a SET MAX command to the second storage device $112_2$ that sets the maximum accessible sector of the second storage device $112_2$ to the number of sectors in the smallest portion $204_1, 204_2$ of the second storage device $112_2$.

The SD initialization code 118 in block 312 may initialize the storage devices $112_1, 112_2$ and SD controller 110 for better performance based upon the device identification data. In particular, the SD initialization code 118 may program the storage devices $112_1, 112_2$ and the SD controller 110 for the highest performance settings supported by the storage devices $112_1, 112_2$ and the SD controller 110. For example, the SD initialization code 118 may program the storage devices $112_1, 112_2$ and SD controller for the fastest support PIO, multi-word DMA, Ultra DMA mode, etc.

The SD initialization code 118 in block 314 may update the BIOS data area 122 to report to the operating system 124 that the capacity of the first storage device $112_1$ equals the capacity of the smallest portion $202_1, 202_2$. Further, the SD initialization code 118 may update the BIOS data area 122 to report to the operating system 124 that the capacity of the second storage device $112_2$ equals the capacity of the smallest portion $204_1, 204_2$. Accordingly, the SD initialization code 118 substantially reserves half of the storage capacity of the storage devices $112_1, 112_2$ which may be used to implement a RAID level and/or data redundancy.

Figure 4:
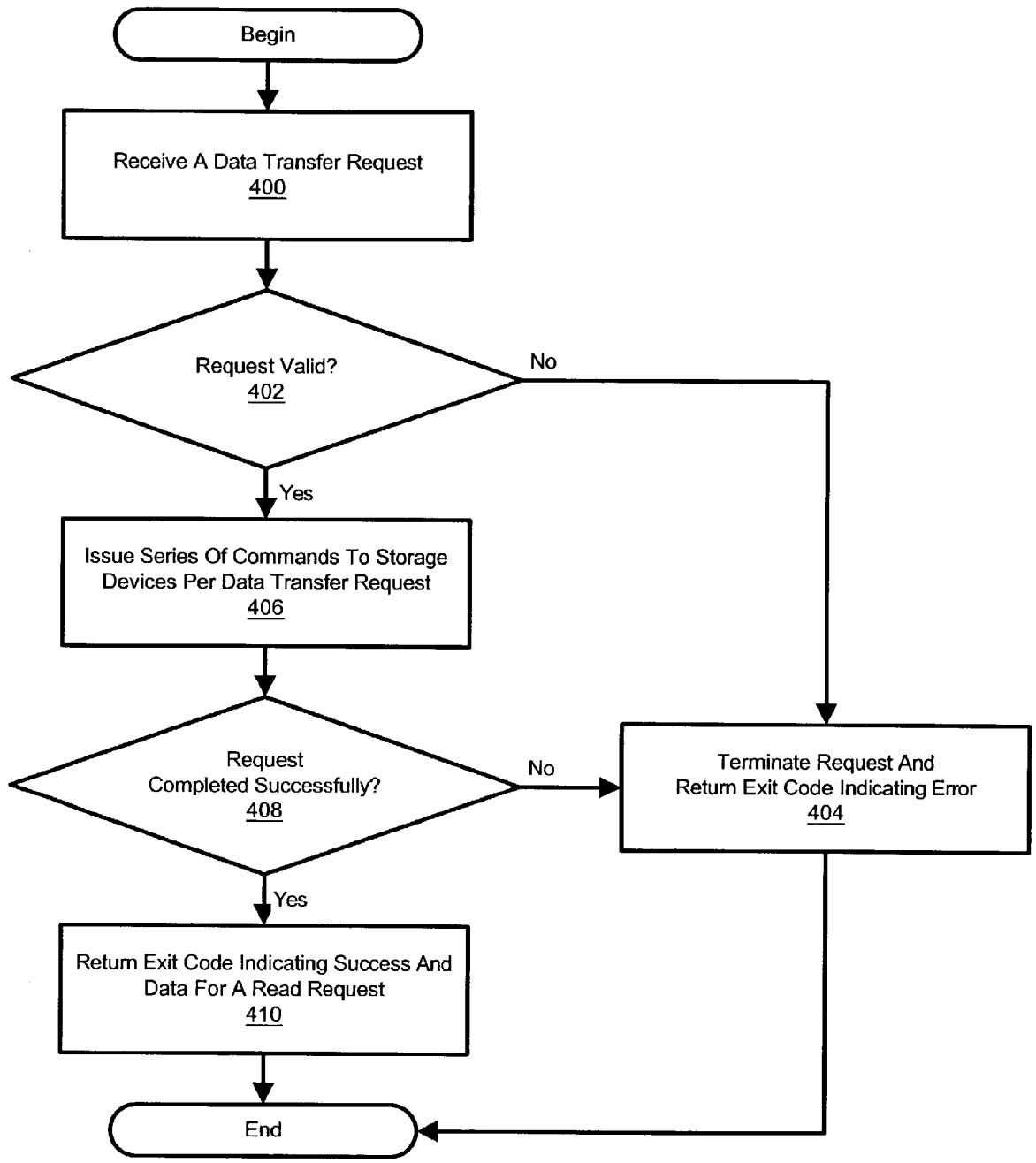
FIG. 4 illustrates an example method of reading from and writing to the array of FIG. 2.

In FIG. 4, an example method of accessing the storage array 200 of FIG. 2 is illustrated. In block 400, the SD handler 120 may receive a request to read or write data to the storage array 200. In one embodiment, the SD handler 120 may receive such a request in response to various events such as, for example, an application and/or the operating system 124 requesting data be read from and written to the storage array 200. In particular, an application and/or the operating system 124 may generate interrupt 13H that results in request parameters being provided to the SD handler 120 associated with interrupt 13H.

The SD handler 120 in block 402 may determine whether the request is valid. In one embodiment, the SD handler 120 may determine whether the requested sectors correspond to accessible sectors of the first portions $202_1, 204_1$ of the storage array 200. For example, the request may provide a sector count and a starting sector identified an LBA (Logical Block Addressing) address or a CHS (cylinder/head/sector) address. The SD handler 120 may determining an end sector from the starting sector and the sector count. Further, the SD handler 120 may determine, based upon the maximum accessible sectors indicated by the BIOS data area 122, whether the starting sector and the end sector lie within the accessible sector ranges of the first portions $202_1, 204_1$. In response to determining that the request is invalid, the SD handler 120 may terminate the request and provide the application and/or operating system 124 that made the request with an exit message or an exit code that indicates an error occurred (block 404).

In block 406, the SD handler 120 may issue a series of commands to the storage devices $112_1$, $112_2$ of the the storage array 200 that implement the requested transfer. For example, in response to a request to read a stripe of data from the storage array 200, the SD handler 120 may issue a series of read commands to the storage devices $112_1$, $112_2$ which cause the storage devices $112_1$, $112_2$ to return the requested data from the first portions $202_1$, $202_2$. It should be appreciated that the number of read commands generated depends upon both the amount of data requested and the size of each chunk. For example, in response to a request for 64 kilobytes of data from a storage array 200 using 32 kilobyte chunks, the SD handler 120 may issue a first read command to the first storage device $112_1$ to obtain a first 32 kilobyte chunk and may issue a second read command to the second storage device $112_2$ to obtain a second 32 kilobyte chunk. Further, if a read error occurs, then the SD handler 120 may issue a third read command and a fourth read command to the storage devices $112_1$, $112_2$ to obtain mirrored copies of the first 32 kilobyte chunk and the second 32 kilobyte chunk from the second portions $202_2$, $204_2$.

Similarly, in response to a request to write a stripe of data to the storage array 200, the SD handler 120 may issue a series of write commands to the storage devices $112_1$, $112_2$ which cause the storage devices $112_1$, $112_2$ to store data of the request to the first portions $202_1$, $202_2$ and to mirror the data to the second portions $202_2$, $204_2$. For example, in response to a request to write 64 kilobytes of data to a storage array 200 using 32 kilobyte chunks, the SD handler 120 may issue a first write command to the first storage device $112_1$ that results in a first 32 kilobyte chunk being stored in the first portion $202_1$, and may issue a second write command to the second storage device $112_2$ that results in a second 32 kilobyte chunk being written to the first portion $204_1$. Further, the SD handler 120 may issue a third write command to the second storage device $112_2$ that results in the first 32 kilobyte chunk being mirrored to the second portion $204_2$, and may issue a fourth write command to the first storage device $112_1$ that results in the second 32 kilobyte chunk being mirrored to the second portion $202_2$.

The SD handler 120 in block 408 may determine whether the requested transfer completed successfully. In response to determining that the request completed successfully, the SD handler 120 in block 410 may terminate and may provide the application and/or operating system 124 with an exit code that indicates that the request completed successfully. Further, if the request was a read request, the SD handler 120 may further provide the application and/or operating system 124 with the requested data, a pointer to the requested data, or store the requested data at a location requested by the application and/or operating system 124. In response to determining that the request did not complete successfully, the SD handler 120 in block 404 may terminate and may provide the application and/or operating system 124 with an exit code that indicates that the request failed.

Figure 5:
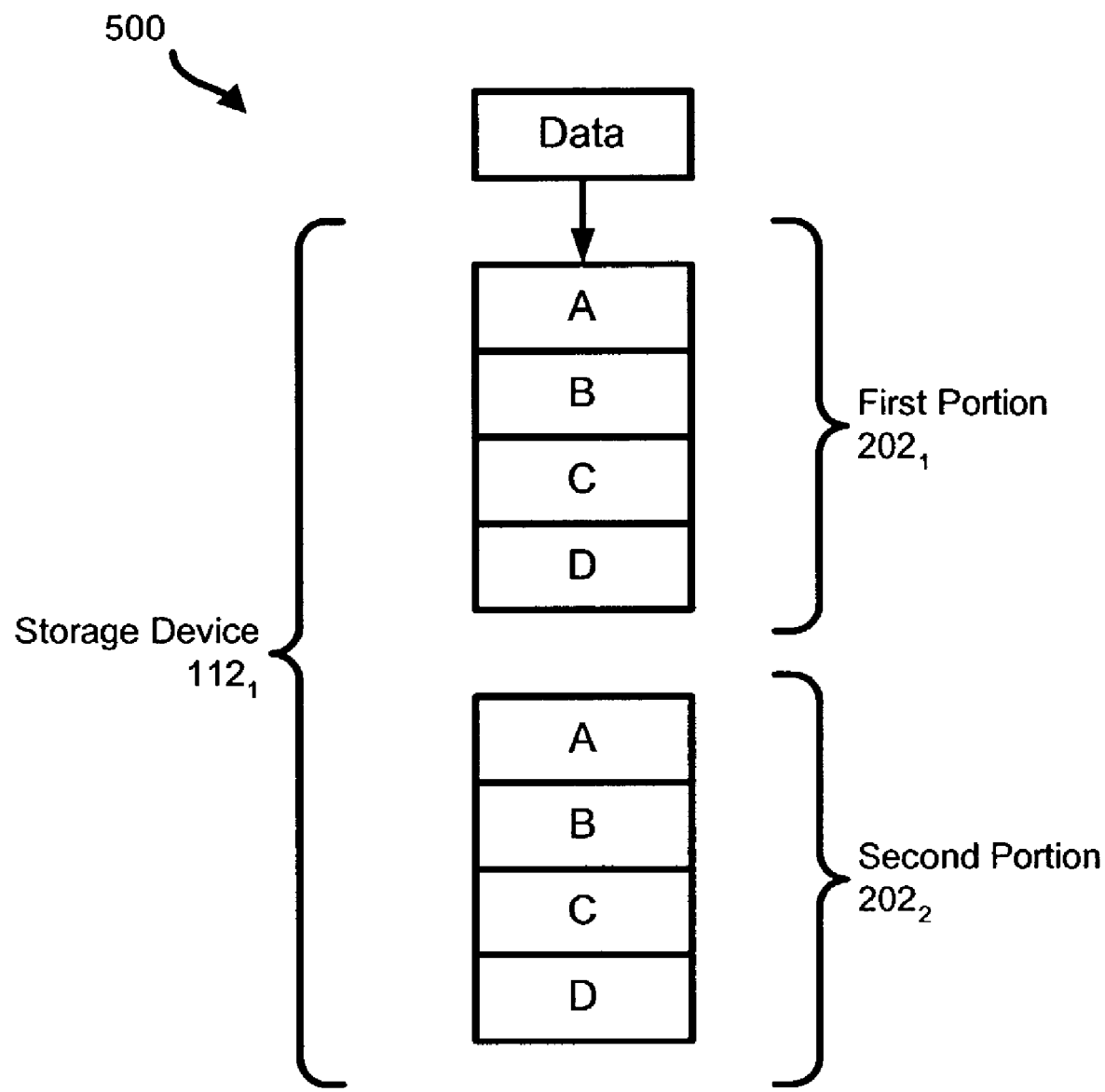
FIG. 5 illustrates another example storage array of the computing device of FIG. 1.

Referring now to FIG. 5, another storage array 500 is shown. As shown, the storage array 500 may comprise a single storage device $112_1$, whereas conventional storage arrays such as, for example, RAID 0 and RAID 1 arrays require at least two storage devices. As depicted, the storage device $112_1$ may comprise a first portion $202_1$ and a second portion $202_2$. In general, the first portion $202_1$ and the second portion $202_2$ combine to form a RAID 1 array in which data of the first portion $202_1$ is mirrored to the second portion $202_2$. For example, as illustrated in FIG. 5, data may be split into chunks A . . . D and the chunks A . . . D may be written to the first portion $202_1$ and mirrored to the second portion $202_2$ of the storage device $112_1$.

The mirroring of data in general doubles the number of bytes written to the storage device $112_1$ in comparison to a non-mirroring storage device. Accordingly, the storage array 500 may achieve data write performance that is half of a non-mirroring storage device. However, the storage array 500 may achieve data read performance that approaches the read performance of a non-mirroring storage device since read request may be serviced by one portion of the storage device $112_1$. Moreover, the storage array 500 may gracefully tolerate failures to read data from the first portion $202_1$ by retrying the request to the second portion $202_2$ of the storage device $112_1$. In this manner, the storage array 500 may tolerate intermittent storage or device errors and may provide some protection from data loss resulting from a failing storage device.

Figure 6:
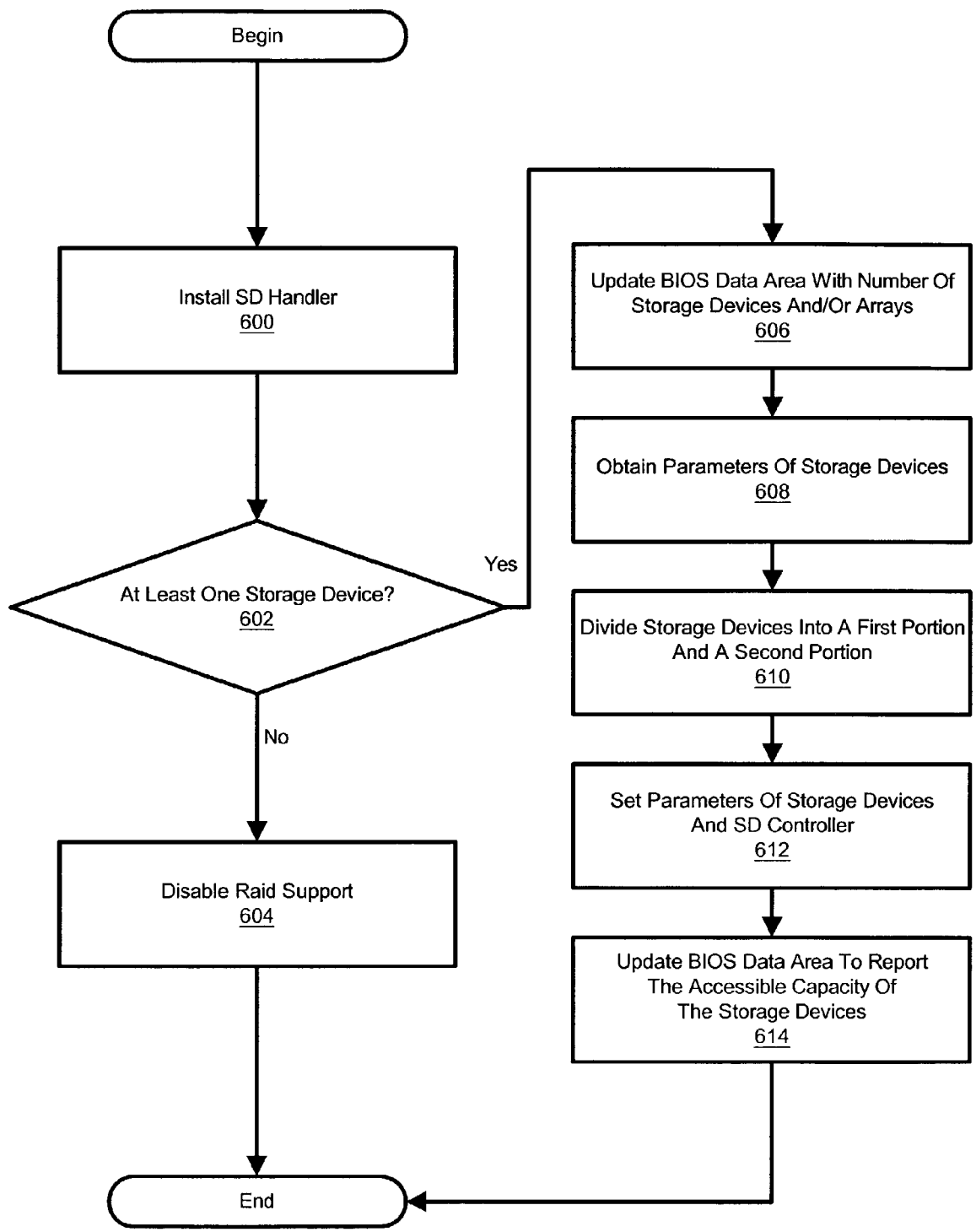
FIG. 6 illustrates an example method of initializing the array of FIG. 5.

In FIG. 6, an example method of creating the storage array 500 of FIG. 5 is illustrated. In one embodiment, the computing device 100 may execute the method of FIG. 6 in response to various events such as, for example, a system power-up event, a system reset event, etc. Further, the computing device 100 in one embodiment may execute the method of FIG. 5 prior to invoking the operating system 124 or a boot loader used to invoke execution of the operating system 124. In block 600, the SD initialization code 118 may install the SD handler 120. In one embodiment, the SD initialization code may install the SD handler 120 in a manner similar to block 300 of FIG. 3.

The SD initialization code 118 may further determine in block 602 whether there is at least one usable storage device $112_1$ . . . $112_D$ connected to the SD controller 110. To this end, the SD initialization code 118 may perform various tests and/or diagnostics in a manner similar to block 302 of FIG. 3. In response to determining that there is not at least one usable storage device, the SD initialization code 118 in block 604 may disable RAID support and exit. Otherwise, the SD initialization code 118 in block 606 may update the BIOS data area 122 to report to the operating system 124 the number of storage devices and/or arrays that are coupled to the SD controller 110. The SD initialization code 118 in block 608 may obtain parameters of the usable storage devices $112_1$ . . . $112_D$. Again, the SD initialization code 118 may obtain parameters of the usable storage devices in a manner similar to block 308 of FIG. 3.

In block 610, the SD initialization code 118 may divide the storage device $112_1$ into two substantially equal portions $202_1$, $202_2$. In one embodiment, the SD initialization code 118 may divide the storage device $112_1$ into a first portion $202_1$ and a second portion $202_2$ by issuing a SET MAX command to the first storage device $112_1$ that sets the maximum accessible sector of the storage device $112_1$ to the number of sectors in the smallest portion $202_1$, $202_2$ of the storage device $112_1$.

The SD initialization code 118 in block 612 may initialize the storage devices $112_1$, $112_2$ and SD controller 110 for better performance based upon the device identification data. In particular, the SD initialization code 118 may program the storage devices $112_1$, $112_2$ and the SD controller 110 for the highest performance settings supported by the storage devices $112_1$, $112_2$ and the SD controller 110. For example, the SD initialization code 118 may program the storage devices $112_1$, $112_2$ and SD controller for the fastest support PIO, multi-word DMA, Ultra DMA mode, etc.

The SD initialization code 118 in block 614 may update the BIOS data area 122 to report to the operating system 124 that the capacity of the storage device $112_1$ equals the capacity of the smallest portion $202_1$, $202_2$. Accordingly, the SD initialization code 118 substantially reserves half of the storage capacity of the storage devices $112_1$ which may be used to implement a RAID level and/or data redundancy.

Figure 7:
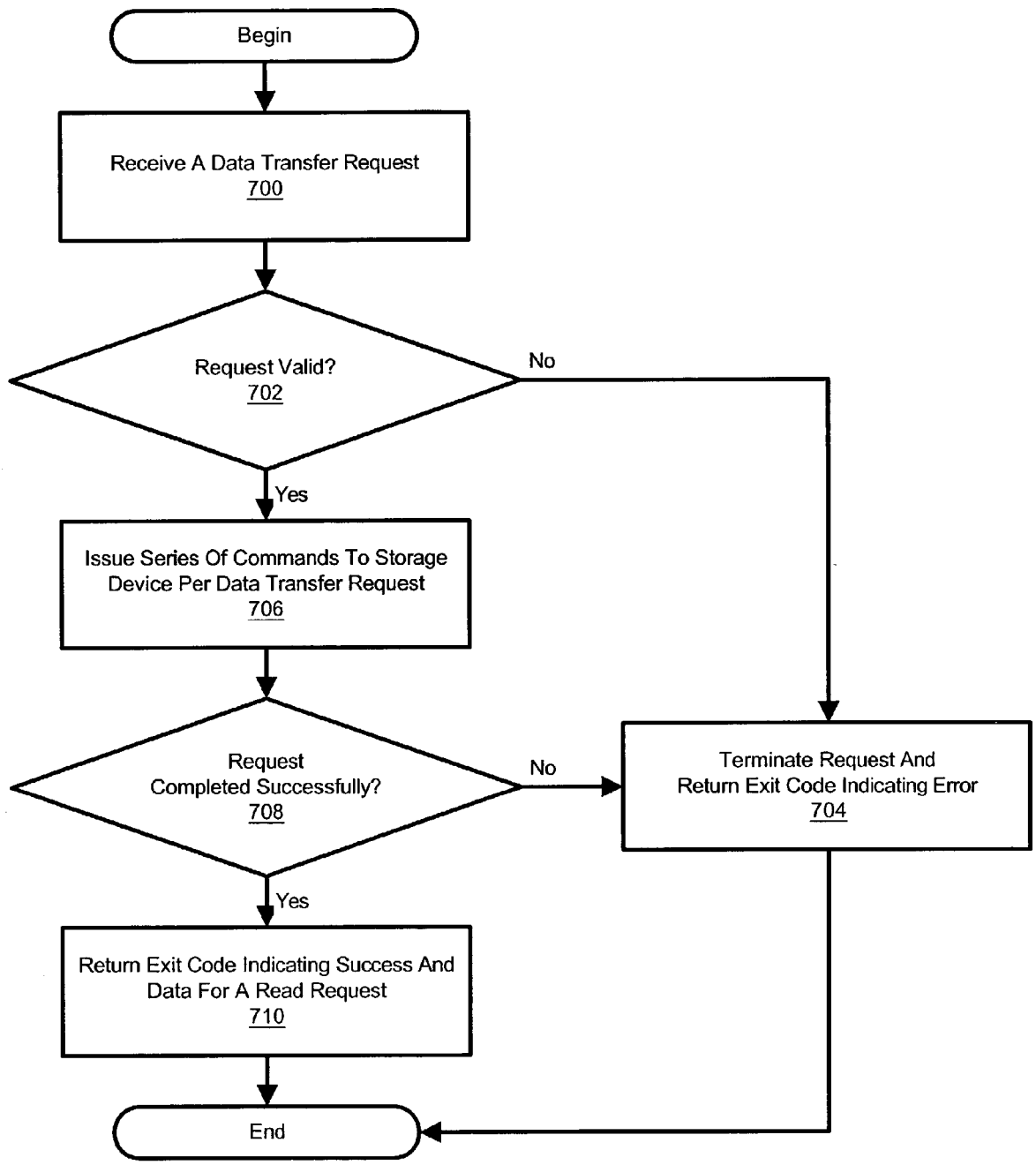
FIG. 7 illustrates an example method of reading from and writing to the array of FIG. 5.

In FIG. 7, an example method of accessing the storage array 500 of FIG. 5 is illustrated. In block 700, the SD handler 120 may receive a request to read or write data to the storage array 500. In one embodiment, the SD handler 120 may receive such a request in response to various events such as, for example, an application and/or the operating system 124 requesting data be read from and written to the storage array 500. In particular, an application and/or the operating system 124 may generate interrupt 13H that results in request parameters being provided to the SD handler 120 associated with interrupt 13H.

The SD handler 120 in block 702 may determine whether the request is valid. In one embodiment, the SD handler 120 may determine whether the sectors of the request correspond to accessible sectors of the first portion $202_1$ of the storage array 500. In response to determining that the request is invalid, the SD handler 120 may terminate the request and provide the application and/or operating system 124 that made the request with an exit message or an exit code that indicates an error occurred (block 704).

In block 706, the SD handler 120 may issue, to the storage device $112_1$ of the the storage array 500, a series of commands that implement the requested transfer. For example, in response to a request for 64 kilobytes of data from a storage array 500 using 32 kilobyte chunks, the SD handler 120 may issue a first read command to the first storage device $112_1$ to obtain first and second 32 kilobyte chunks from the first portion $202_1$. Further, if a read error occurs, then the SD handler 120 may issue a second read command to the storage device $112_1$ to obtain mirrored copies of the first and second 32 kilobyte chunks from the second portion $202_2$.

Similarly, in response to a request to write a stripe of data to the storage array 500, the SD handler 120 may issue a series of write commands to the storage device $112_1$ which cause the storage device $112_1$ to store data of the request to the first portion $202_1$ and to mirror the data to the second portion $202_2$. For example, in response to a request to write 64 kilobytes of data to a storage array 500 using 32 kilobyte chunks, the SD handler 120 may issue first write command to storage device $112_1$ that results in first and second 32 kilobyte chunks being written to the first portion $202_1$. Further, the SD handler 120 may issue a second write command to the storage device $112_1$ that results in the first and second 32 kilobyte chunks being mirrored to the second portion $202_2$.

The SD handler 120 in block 708 may determine whether the requested transfer completed successfully. In response to determining that the request completed successfully, the SD handler 120 in block 710 may terminate and may provide the application and/or operating system 124 with an exit code that indicates that the request completed successfully. Further, if the request was a read request, the SD handler 120 may further provide the application and/or operating system 124 with the requested data, a pointer to the requested data, or store the requested data at a location requested by the application and/or operating system 124. In response to determining that the request did not complete successfully, the SD handler 120 in block 704 may terminate and may provide the application and/or operating system 124 with an exit code that indicates that the request failed.

The computing device 100 may perform all or a subset of the operations shown in FIGS. 3, 4, 6 and 7 in response to executing instructions of a machine readable medium such as, for example, read only memory (ROM); random access memory (RAM); magnetic disk storage media; optical storage media; flash memory devices; and/or electrical, optical, acoustical or other form of propagated signals such as, for example, carrier waves, infrared signals, digital signals, analog signals. Furthermore, while FIGS. 3, 4, 6 and 7 illustrate a sequence of operations, the computing device 100 in some embodiments may perform various illustrated operations in parallel or in a different order.

While certain features of the invention have been described with reference to example embodiments, the description is not intended to be construed in a limiting sense. Various modifications of the example embodiments, as well as other embodiments of the invention, which are apparent to persons skilled in the art to which the invention pertains are deemed to lie within the spirit and scope of the invention.

What is claimed is:

1. A method comprising
dividing a first storage device by a firmware that is separate from a controller into a first plurality of portions,
reporting that the first storage device has a storage capacity that is equal to the smallest portion of the first plurality of portions,
issuing commands to the first storage device to transfer data to and/or from the first plurality of portions, and
transferring data to a first portion of the first storage device and mirroring the data to a second portion of the first storage device in response to the first storage device processing the commands.

2. The method of claim 1 further comprising
dividing a second storage device into a second plurality of portions,
reporting that the second storage device has a storage capacity that is equal to the smallest portion of the second plurality of portions, and
issuing commands to the second storage device to transfer data to and/or from the second plurality of portions.

3. The method of claim 2 further comprising striping data across a first portion of the first storage device and a first portion of the second storage device in response to the first storage device and the second storage device processing their respective commands.

4. The method of claim 2 further comprising striping data from a first portion of the first storage device and a first portion of the second storage device in response to the first storage device and the second storage device processing their respective commands.

5. A method comprising
dividing a first storage device by a firmware that is separate from a controller into a first plurality of portions,
reporting that the first storage device has a storage capacity that is equal to the smallest portion of the first plurality of portions,
issuing commands to the first storage device to transfer data to and/or from the first plurality of portions,
dividing a second storage device into a second plurality of portions, reporting that the second storage device has a storage capacity that is equal to the smallest portion of the second plurality of portions, and issuing commands to the second storage device to transfer data to and/or from the second plurality of portions, wherein dividing the first storage device comprises setting a maximum accessible sector of the first storage device to define a first portion and a second portion of the first storage device, and dividing the second storage device comprises setting a maximum accessible sector of the second storage device to define a first portion and a second portion of the second storage device.

6. The method of claim 5 further comprising striping data to a first portion of the first storage device and a first portion of the second storage device and mirroring the data to a second portion of the first storage device and a second portion of the second storage device in response to the first storage device and the second storage device processing their respective commands.

7. A computing device comprising a processor, a controller to transfer data between the processor and at least one storage device, and firmware that is separate from the controller, the firmware comprising instructions which when executed by the processor result in the processor dividing the at least one storage device into a plurality of portions, and creating a storage array that implements one or more RAID (Redundant Arrays of Inexpensive Disks) levels from the plurality of portions of the at least one storage device, wherein the firmware comprises instructions that in response to being executed result in the processor dividing the at least one storage device by setting a maximum accessible sector of the at least one storage device to define a first portion and a second portion of the at least one storage device.

8. The computing device of claim 7 further comprising an operating system that, in response to being executed, result in the processor accessing the at least one storage device via a storage device handler of the firmware.

9. The computing device of claim 8 wherein the operating system generates an interrupt that causes the processor to invoke execution of the storage device handler.

10. The computing device of claim 7 wherein the at least one storage device comprises a first storage device and a second storage device, and the firmware comprises instructions that in response to being executed result in the processor dividing the first storage device into a first portion and a second portion, and the second storage device into a first portion and a second portion.

11. The computing device of claim 10 wherein the firmware comprises instructions that in response to being executed result in the processor striping data across the first portion of the first storage device and the first portion of the second storage device.

12. The computing device of claim 10 wherein the firmware comprises instructions that in response to being executed result in the processor mirroring data of the first portion of the first storage device to the second portion of the second device and mirroring data of the first portion of the second storage device to the second portion of the first storage device.

13. The computing device of claim 7 wherein the processor is separate from the controller.

14. For a computing device comprising one or more storage devices, firmware that is separate from a controller for the one or more storage devices comprising a plurality of instructions that in response to being executed result in the computing device defining a first portion and a second portion of a first storage device by reporting storage capacity of the first storage device to be substantially half of its total storage capacity, defining a first portion and a second portion of a second storage device by reporting storage capacity of the second storage device to be substantially half of its total storage capacity, creating a storage array that comprises the first portion and the second portion of the first storage device and the first portion and the second portion of the second storage device, defining the first portion and the second portion of the first storage device by setting maximum accessible sector of the first storage device, and defining the first portion and the second portion of the second storage device by setting a maximum accessible sector of the second storage device.

15. The firmware of claim 14 further comprising instructions that result in the computing device striping data across the first portion of the first storage device and the first portion of the second storage device.

16. The firmware of claim 14 further comprising instructions that result in the computing device mirroring data written to the first portion of the first storage device and the first portion of the second storage device to the second portion of the first storage device and the second portion of the second storage device.

17. The firmware of claim 14 further comprising instructions that result in the computing device mirroring data written to the first portion of the first storage device to the second portion of the second storage device, and mirroring data written to the first portion of the second storage device to the second portion of the first storage device.

18. The firmware of claim 17 further comprising instructions that result in the computing device striping data across the first portions of the first storage device and the second storage device.

* * * * *